United States Patent

[11] 3,591,887

[72] Inventor James Edward Keddie
 1 Freelands Road, Bromley, Kent, England
[21] Appl. No. 799,006
[22] Filed Feb. 13, 1969
[45] Patented July 13, 1971

[54] WINDSCREEN WASHER DEVICE
 10 Claims, 8 Drawing Figs.
[52] U.S. Cl. ................................................ 15/250.02, 15/250.03
[51] Int. Cl. .................................................. A471 1/02
[50] Field of Search .................................... 15/250.01, 250.02, 250.03, 250.04; 103/146

[56] References Cited
UNITED STATES PATENTS
| | | | |
|---|---|---|---|
| 133,048 | 11/1872 | Painter | 103/146 |
| 2,168,202 | 8/1939 | Grantham | 15/250.04 |
| 2,333,854 | 11/1943 | Fuller | 15/250.04 |
| 3,447,186 | 6/1969 | Senkewich | 15/250.04 |

FOREIGN PATENTS
| | | | |
|---|---|---|---|
| 548,561 | 9/1956 | Italy | 15/250.04 |
| 554,690 | 1/1957 | Italy | 15/250.04 |

Primary Examiner—Robert W. Jenkins
Attorney—Stevens, Davis, Miller and Mosher

ABSTRACT: A windscreen washer assembly including a rotary positive displacement pump driven from the wiper spindle and feeding washing fluid to a washing fluid applying device mounted on the wiper arm. Preferably the blade support is hollow and includes apertures through which the washing fluid can be applied to the windscreen from the leading side of the blade support. conveniently hot or cold water can be applied by manipulation of a selector valve.

PATENTED JUL 13 1971

Inventor
JAMES E. KEDDIE

By Stevens Davis Miller & Mosher

Attorneys

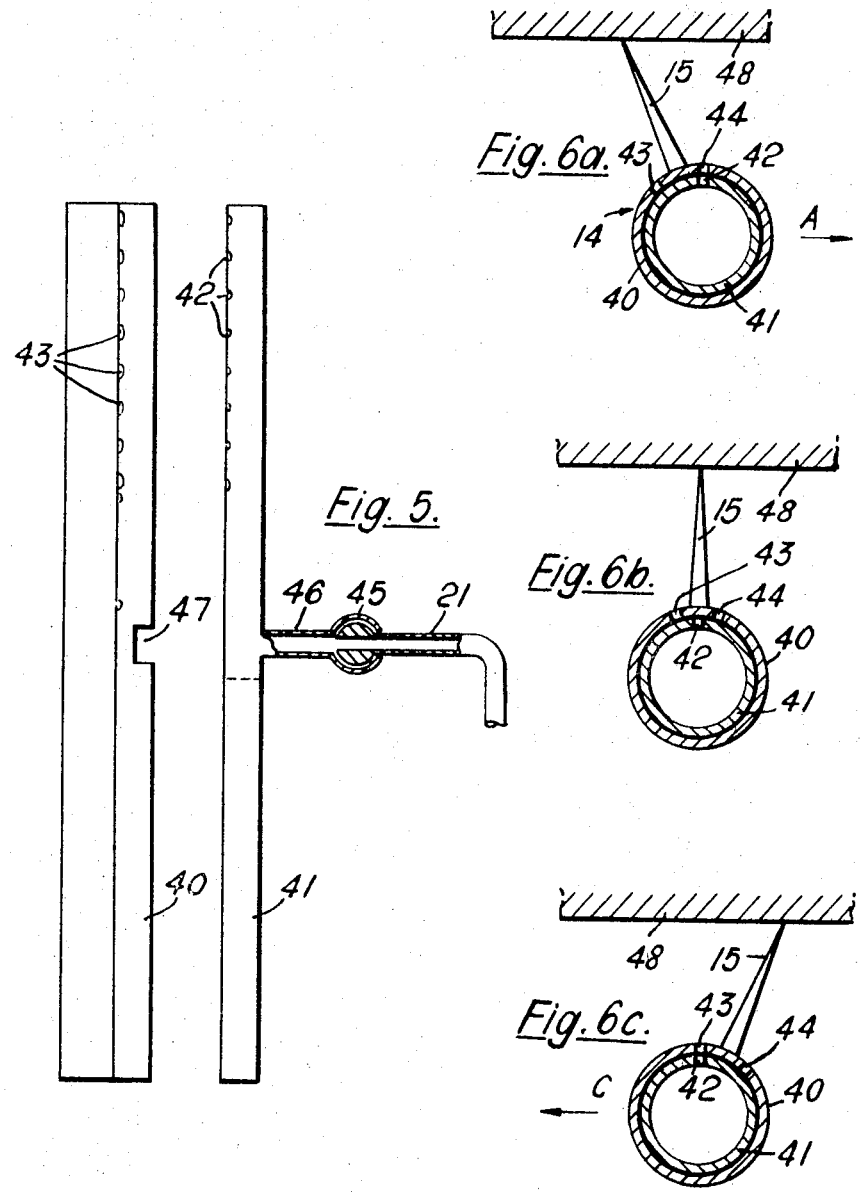

WINDSCREEN WASHER DEVICE

The present invention relates to a windscreen wiper and washer assembly. The invention also relates to the installation of such a windscreen wiper and washer assembly in a vehicle.

According to a first aspect of the present invention I provide a windscreen wiper and washer assembly comprising a windscreen wiper arm driven for oscillatory pivotal movement, a source of windscreen washing fluid, washing fluid introduction means mounted on said wiper arm and comprising at least one outlet communicated with said source. Advantageously the wiper arm may be hollow and communicate the pump with the space within a hollow wiper blade support, the or each outlet comprising an aperture formed in the walls of said blade support. Preferably several apertures are formed in the blade support along the upper part thereof, and said upper part may desirably comprise one third of the length of said blade support.

Suitably the pump may have a moving part driven to execute oscillatory rotational motion and said wiper arm may be attached to the moving pump part. Conveniently said moving part may comprise a hollow part cylindrical component sealingly mounted coaxially within a stationary casing part which itself comprises a major segment of a cylinder, said moving part being provided with a chordally extending wall in which nonreturn flap valves are formed. Desirably said stationary part may be provided with an inverted V-shaped partition the walls of which extend substantially radially of the pump, the walls being provided with nonreturn flap valves.

According to a second aspect of the present invention I provide a vehicle including the windscreen wiper and washer assembly of the first aspect of this invention, the moving part of the pump being driven by the wiper spindle of the vehicle. Conveniently the source of washing fluid may be communicated with a water catchment surface of the vehicle. Suitably the pump may be fed by means of a temperature selector valve arranged to communicate the pump selectively with a source of cold water or a source of hot water.

In order that the present invention may more readily be understood the following description is given, merely by way of example, with reference to the accompanying drawings, in which.

Figure 1:
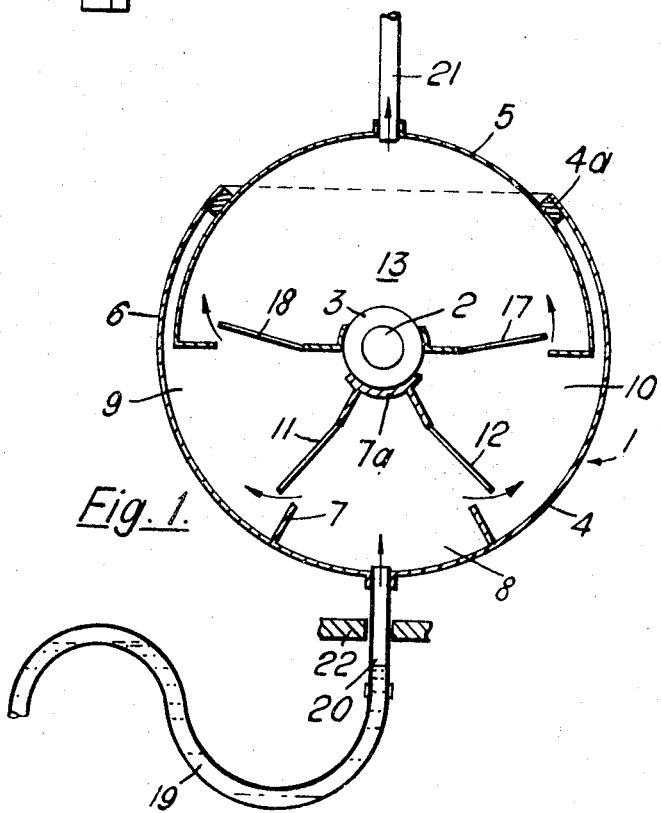
FIG. 1 shows a front elevational, partly schematic view of a pump for use with a windscreen wiper assembly constructed in accordance with the present invention.

Referring now to FIG. 1, there is shown a positive displacement pump 1 arranged to be driven by the normal windscreen wiper spindle of a vehicle such as an automobile. Although the following description relates specifically to the installation of a windscreen wiper assembly of the invention in an automobile vehicle, it is to be understood that the device may equally well be incorporated in aircraft, gas-cushion vehicles, ships, or indeed any other installations where it is desired to wipe clean a surface by means of a wiper arrangement. The conventional wiper spindle 2 is received within an annular bushing 3 formed integrally with an upper pump part 5 which is thus caused to undergo oscillatory rotational strokes about the axis of the spindle 2.

The upper moving part 5 which is in the form of a semicylinder is received within a stationary pump part 4 in the form of a major segment of a cylinder. The substantially cylindrical space contained within the two pump parts 5 and 6 is sealed with respect to atmosphere by means of a watertight seal 4a which extends chordally across the front and rear walls of the outer pump 6 and also axially along the inner face of the outer cylindrical wall of the stationary pump part. Thus water or other fluid being pumped is unable to escape through the sliding fit between the inner and outer pump parts 5 and 6.

The lower part of the stationary pump casing 6 is provided with an inverted V-shaped partition 7 which serves both as a wall for an inlet chamber 8 of the pump and also as a cradle on which the moving pump part 5 is supported. The actual cradle arrangement comprises a part cylindrical wall 7a positioned at the apex of the inverted V of the wall 7 and shaped to conform with the outer cylindrical surface of the bushing 3. The walls 7 are integrally formed with the cylindrical wall of the lower stationary pump casing 6 and are formed integrally with the back face of the casing. Moreover, the cradle piece 7a, by virtue of its cylindrical radially inner face prevents the passage of water between itself and the bushing 3.

The lower or stationary pump part 6 is provided with a removable front wall 6a which has, near its top, part of the sealing strip 4a of the stationary outer casing and, moreover, the front face 6a is arranged to be bolted sealingly to engage with the walls 7 and cradle piece 7a in order further to seal the inlet chamber 8 with respect to the remainder of the space within the stationary casing part 6.

The space within the lower stationary casing part 6 is divided into two intermediate pumping chambers 9 and 10, one positioned on either side of the inverted V-piece 7, and these intermediate chambers 9 and 10 are communicated with the inlet chamber 8 by means of nonreturn flap valves 11 and 12 respectively. The valves 11 and 12 are arranged so that they open to permit flow from the inlet chamber to the respective intermediate chamber but they close upon reversal of flow to prevent liquid passing through in the opposite sense.

The pump outlet chamber 13 is provided in the upper or moving pump part 5 and is sealed with respect to the intermediate chambers 10 and 9 by means of nonreturn flap valves 17 and 18 respectively which are arranged to permit flow from the respective intermediate chamber into the outlet chamber but not in the reverse sense.

Figure 2:
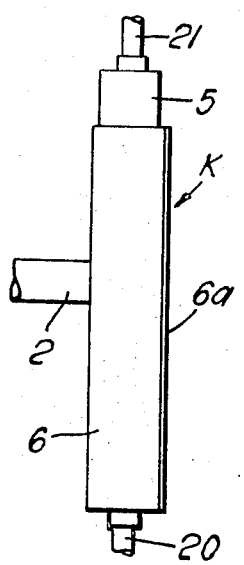
FIG. 2 is a side elevational view of the pump of FIG. 1.

The pump is further provided with a flexible inlet conduit 19 which includes a U-shaped portion adjacent the union with a rigid inlet pipe 20, the U-shaped portion serving to provide a reservoir of fluid to assist in priming the pump upon initial operation. Moreover, the moving pump part 5 is provided with a rigid outlet pipe 21 which constitutes the arm of the windscreen wiper assembly. The rigid inlet pipe 20 may be clamped with respect to the surrounding vehicle body so that the stationary casing part 6 is supported by means of the clamping location 22 and of the areas of contact with the moving pump part 5 which is itself rigidly attached to the windscreen wiper spindle 2. Reference to FIG. 2 shows that the outer axial dimension of the moving pump part 5 is less than that of the stationary casing part 6, and, in this embodiment, is less than the inner axial dimension of the stationary casing part 6 in order to provide a clearance within which the sealing strip 4a may be situated. Clearly, if desired the sealing strip 4a may be dispensed with and face contact of the outer faces of the front and rear walls of the pump part 5 against the inner faces of the front and rear walls of the stationary pump part 6 may be relied upon in order to provide a seal between these two components.

Figure 3:
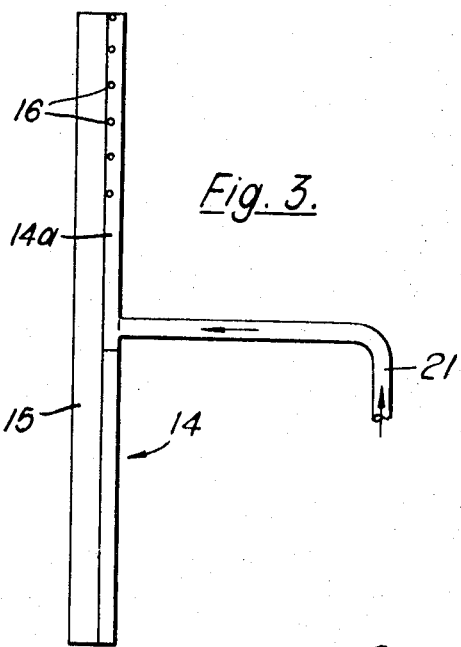
FIG. 3 is a side elevational view of a windscreen wiper for use with the pump of FIGS. 1 and 2.

FIG. 3 shows the windscreen wiper blade assembly mounted at the upper end of the hollow arm 21 through which washing liquid is conveyed from the pump 1 to the wiper blade support 14. The partly schematic view of FIG. 3 shows that the upper part 14a of the blade support 14 is hollow permitting flow of washing fluid to apertures 16 formed in the sides of the blade support 14 near the top thereof. The entire blade support 14 is arranged to provide a secure mounting for a flexible wiper blade 15. The apertures 16 are positioned within the top one third of the extent of the blade support 14 so that, during operation of the wiper, water or other washing fluid is deposited on the screen near the outer part of the arcuate swept area of the screen so that, as the fluid is conveyed downwards under the effect of gravity then it will tend to form a uniformly distributed film across the swept area of the screen.

During operation of the wiper assembly, the blade support 21 will be caused to undergo pivotal movement about the axis of the wiper spindle 2 so that the blade sweeps in an arcuate travel across the screen as in conventional windscreen wipers.

By way of further explanation, the operation of the illustrated windscreen wiper system will now be described. Initially, liquid will be present in the U-shaped portion of the inlet conduit 19. The schematic view of FIG. 1 does not make clear the ideal relationship between the inlet conduit 19 and the pump 1. For adequate self-priming it is preferable for the left hand part of the U-shaped section of the inlet conduit 19 to be positioned above the cradle member 7a so that when the pump is inoperative substantially the whole of the space comprising the inlet chamber 8 and intermediate chambers 9 and 10 is filled with pumping fluid. This being the case, as soon as the moving pump part 5 commences its oscillatory pivotal motion pumping action of the pump will commence. However, the arrangement of FIG. 1 will nevertheless permit at least some degree of self-priming action, and the pump will operate satisfactorily without priming, provided the flap valves 10 and 11 and the sealing faces of the pump parts are substantially airtight when sealed.

During operation of the pump fluid passes from the inlet chamber 8 to one of the intermediate chambers 9 and 10, and simultaneously from the other intermediate chamber 9 or 10 to the outlet chamber 13. Considering now the fluid flow during a pivotal stroke in the anticlockwise sense, the intermediate chamber 9 will tend to contract and thus the flap valve 11 will be caused to move to its closed position and then be held firmly against the seating, and simultaneously the flap valve 18 will pivot to its open position and permit fluid flow from the intermediate chamber 9 into the outlet chamber 13. Simultaneously expansion of the intermediate chamber 10 will take place and thus the flap valve 17 will pivot to its closed position and be held firmly against the seating, while flap valve 12 opens allowing fluid to enter the expanding intermediate chamber 10 from the inlet chamber 8. As fluid leaves the inlet chamber 8 the supply is replenished by the flow of further fluid from a suitable reservoir by means of the inlet conduit 19.

Upon reversal of the direction of movement of the moving pump part 5, flap valves 12 and 18 will close and valves 11 and 17 will open causing flow from the inlet chamber 8 into the expanding intermediate chamber 9 and simultaneous flow from the contracting intermediate chamber 10 into the outlet chamber 13, thereby expelling the previously transferred fluid out of the intermediate chamber 13, up into the blade support 14.

It will be seen that, as the wiper blade 15 undergoes oscillatory motion across the swept area of the screen, fluid will be pumped through the apertures 16 and, as explained above, will fall under gravity from the upper part of the blade 15 down across the full extent of the blade and thus be deposited in an even film across the swept area of the screen. Pumping will continue during operation of the wiper and, when the wiper is switched off, motion will cease and so also will the pumping action of the pump 1.

Figure 4:
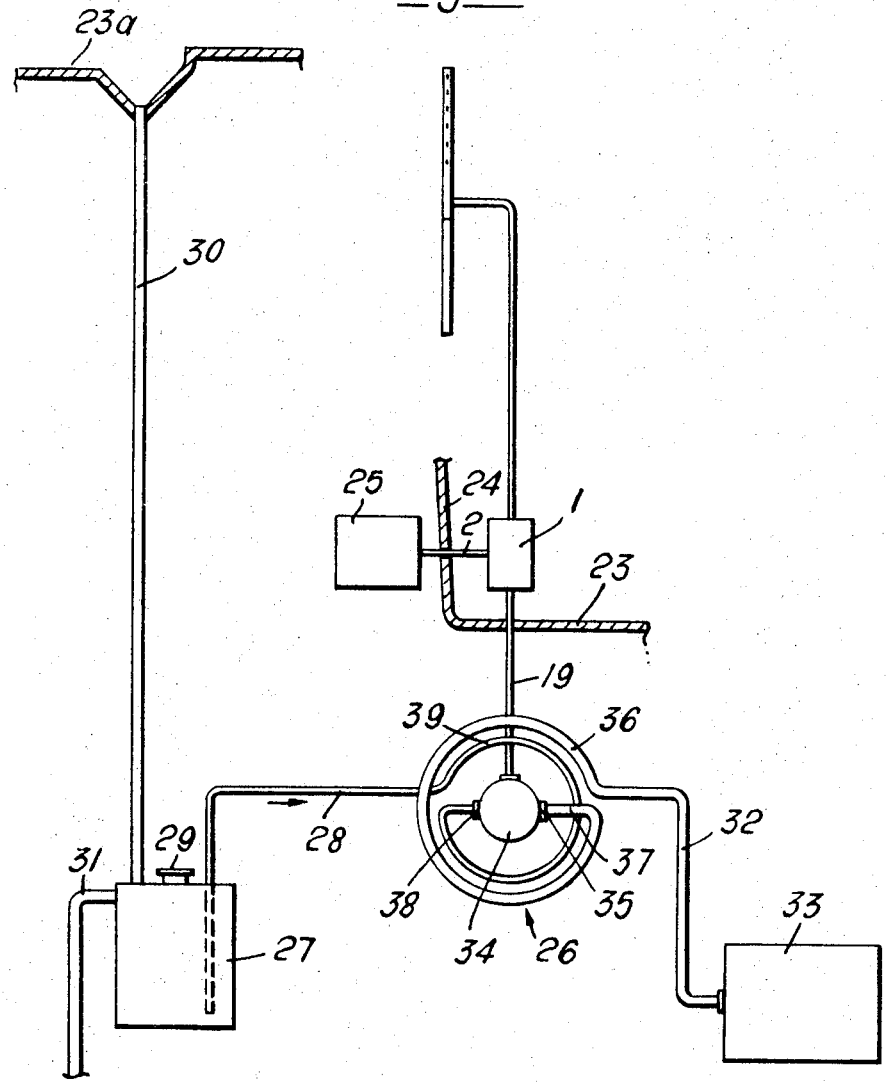
FIG. 4 is a schematic view of a windscreen wiper assembly incorporating the pump and wiper of FIGS. 1 to 3, and FIGS. 5 and 6 show a modified blade assembly.

FIG. 4 shows the installation of the pump of FIGS. 1 to 3 in an automobile having a bonnet 23 and windscreen 24. The pump unit 1 is mounted externally on the end of the wiper spindle 2 which is driven for oscillatory rotational movement by a suitable windscreen wiper motor 25. Thus, as explained above, the windscreen wiper will clear an area of the screen and will simultaneously wipe washing fluid such as water across the swept area. The flexible inlet conduit 19 is fed directly from a mixer unit 26 which enables the liquid supply to the pump 1 to be selectively connected either to a source of hot water or a source of cold water. In FIG. 4 the source of cold water comprises a tank 27 communicated with the temperature selector unit by means of a conduit 28 passing from a location near the bottom of the tank 27, the tank being provided with a filler cap 29 and also a feed conduit 30 arranged to supply the tank from a suitable water catchment area such as the roof 23a of the automobile. In order to ensure that the level of fluid in the tank does not exceed a predetermined upper limit the tank is provided with an overflow pipe 31.

Hot water to the temperature selector 26 is fed by way of a feed conduit 32 communicating the temperature selector unit with a source of fluid 33 heated by the waste heat of the automobile engine. Such source of hot fluid may comprise the radiator header tank of the vehicle or alternatively an additional water jacket which is positioned in contact with the cylinder block of the vehicle engine but separate from the main engine cooling system. The use of a hot water pumping system is particularly desirable for removing or preventing frost and ice deposits on the screen in winter time.

As illustrated in FIG. 4, the temperature selector unit comprises a rotary valve 34 arranged to communicate an outlet port with either a hot water inlet port or a cold water inlet port, as desired. The hot water inlet port 35 is connected to the hot water feed conduit by means of a hot water priming coil 36 which is located substantially coaxially with the axis of rotation of the rotary valve 34. The arrangement of the priming coil 36 is such that fluid flowing from the feed conduit 32 passes upwardly into the inlet end of the coil and, after passing through the coil for a complete convolution, the water ascends into a short inlet duct 37 leading to the port 35. Similarly, the cold water feed conduit 28 is communicated with a cold water inlet port 38 by means of a cold water priming coil 39 so that water from the feed conduit 28 passes upwardly into the inlet end of the priming coil 39 and passes through an entire convolution before arriving at the cold water inlet port 38. Clearly, clockwise rotation of the rotary valve 34 through 90° from its FIG. 4 position will cause the valve to arrive in a position in which the hot water inlet port 35 is communicated with the pump inlet conduit 19.

The operation of the two priming coils 36 and 39 is such that water flowing into the temperature regulating unit will rise for substantially a quarter of a convolution until arriving at the highest point of the associated convolution after which the water will descend through half a convolution and then climb again through the last quarter before entering the associated port 35 or 38. Thus, if air leaks are present in the pump, then when the apparatus is inoperative, water can only drain back into the associated reservoir from the highest point of the convolution and thus the entire length of the associated feed conduit 32 or 28 and only one quarter of a convolution will be empty. The water in the remaining three-quarters of a convolution and in the inlet duct will remain ready for the next of the pumping operations from that particular liquid supply. If the pump is airtight and valve 34 is selected to an intermediate position such draining is hindered.

The temperature selector unit may be mounted at any convenient location within the associated vehicle and will normally be associated with a manual control which is mounted within the passenger space or cabin of the vehicle. Thus an occupant of the vehicle cabin may select cold water for normal wiping/washing operation or hot water for windscreen defrosting applications. Furthermore, in cold weather the liquid in the temperature selector unit 26 will be prevented from freezing while the engine is running since heat from the hot water reservoir 33 will be conducted along the feed conduit 32 into the hot water priming coil 36 so that the entire priming coil 36 will serve as a feeding jacket to maintain the temperature of the regulating unit above freezing point.

The windscreen wiper and washer unit of the present invention will prevent smearing of the windscreen by dust and muddy water thrown up onto the screen because the blade having a flow of washing fluid down the contacting edge will, during movement across the screen, be immediately preceded by the washing fluid so that a part of the screen is washed practically at the same instant that the same part of the screen undergoes the wiping action of the rubber edge of the blade. Because of the very short lag between application of the washing liquid and the subsequent wiping action there will be no residue of vision impeding liquid over the outer face of the screen as is the case with conventional windscreen washers where moisture is first applied to the screen from a separate jet and is then wiped across the screen by the wiper blade.

Since the assembly of the present invention will provide a very thin film of fluid spread across the outer surface of the screen there will be less likelihood of the formation of discrete raindrops on the windscreen since they will be absorbed into the general water film upon impact and will thereafter be collected by the blade and wiped toward one or other end of the swept area. Moreover, any sand or grit particles impinging on the outer face of the screen will be washed away during travel of the wiper blade by the action of the washing fluid pushed across the swept area of the screen, and will thus not be wiped mechanically across the screen as is the case with a conventional windscreen washer in which scratching and abrasion of the screen surface may occur.

If sufficient washing fluid were available, as would be the case where the cold water reservoir 27 is permanently replenished by water flow from the vehicle roof, it would be possible to provide an arrangement in which the windscreen washing facility is operating all the time the wiper is in operation. However, if desired, a suitable shutoff valve may be included in the system in order to enable the operator of the windscreen wiper/washer assembly to dispense with the washing facility while still maintaining normal wiping operation. This may be desirable where extremely heavy rainfall is impinging on the outer surface of the screen and clearly it would be desirable to avoid introducing any further liquid to the screen surface.

If this facility is required, then it may be advantageous to include some air inlet control at the inlet side of the pump in order to ensure that, during the wiping operation, the pump may oscillate freely without building up a suction in the inlet chamber 8. One such air inlet may be in the form of a third "air-inlet" position on the temperature selector control 26.

FIGS. 5 and 6 illustrate a modified blade support arrangement including provision for ensuring that washing liquid is released only on the advancing side of the blade. In FIG. 6a, the blade support 14 comprises concentrically mounted outer and inner tubes 40 and 41, respectively, the outer tube 40 having the blade 15 bonded along a generatrix of its outer surface. The inner tube 41 is provided with a single linear array of fine liquid jets 42, seen also in FIG. 5, and the outer tube 40 is provided with two linear arrays of larger diameter holes 43 and 44, respectively, disposed along generatrices of the outer tube 40, the array 43 being shown in FIG. 5. As shown in FIG. 5, the blade support arm 21 includes a sealed ball joint 45 which joins the arm 21 to a stub tube 46 extending transversely of the inner tube 41. The stub tube 46 will, when the blade assembly is complete, extend through an arcuate slot 47 formed in the outer tube 40, and contact of the stub shaft 46 with the ends of the slot 47 will limit the rotational motion of the outer tube 40 with respect to tube 41 and ensures that the holes in tube 40 are in register with the holes in tube 41 for both directions of motion of the arm 21. The tubes 40 and 41 may be assembled together by sliding tube 40 over 41 until the slot 47, tube 40, registers with the point of attachment of stub tube 46 on tube 41. Stub tube 46 is then secured into the inner tube 41, the stub locating in the slot 47 to ensure register of the holes in 40 and 41 in the axial direction. The tube 40 is closed at one end and may furthermore be closed at the other end after assembly. As in the FIG. 3 embodiment, the washing liquid is prevented from reaching the lower half of the blade support and will therefore all be emitted at the upper one third of the blade.

FIGS. 6a, 6b and 6c illustrate the blade support assembly in cross section and show that as the blade support 14 moves to the right past the screen 48 along the direction of the arrow A in FIG. 6a, the outer tube 40 will pivot in the anticlockwise sense as shown in the Figure so that the array of jets 42 will be in register with the array of larger diameter holes 44 to discharge washing liquid ahead of the sweeping blade 15. The inner and outer tubes 40 and 41 will be a "grease film" fit and thus no washing liquid will be emitted through the holes 43 behind the blade. As the blade arrives at its end position, shown in FIG. 6b, and then commences reversal of movement along the direction of arrow C in FIG. 6c, rotation of the outer tube relative to the inner tube will take place so that now liquid will be emitted through the holes 43 ahead of the returning blade.

The wiper blade apparatus may be modified in order to accommodate curvature of the screen being wiped, and one suitable such modification will be to increase the width of the blade (in other words the distance between the screen and the nearest point on the blade support outer tube 40 in FIG. 6b) from a particularly desirable value of half an inch. The wider blade may conveniently be provided with a wiping edge of concave form which can accommodate the convex outer surface of a screen being wiped. Thus, by using this expedient, there will be no need to modify the tube structure of the blade support 14. However, if desired the blade support structure 14 may itself be made resilient and curved in order to provide the necessary degree of curvature of the wiper arm as in known "-curved-screen" wiper systems.

I claim:

1. In a washer assembly for a vehicle windscreen, having windscreen wiper arm means, and pivot means having an axis for pivoting said wiper arm means for wiping movement across said windscreen about said pivot axis:
    a. washing fluid supply means for conveying washing fluid to said wiper arm means;
    b. washing fluid applying means mounted on said wiper arm means for applying washing fluid to a windscreen being wiped;
    c. oscillatory pump means connected directly to said wiper arm means and communicated with said washing fluid supply means, for executing pumping strokes driven by wiping movement of said wiper arm means;
    d. passage means extending internally of said wiper arm means to communicate said pump means with said washing fluid applying means; and
    e. said pump means including a first pump member, means for mounting said first pump member nonmovably with respect to a vehicle, and a second pump member movable with respect to first pump member and rigidly connected to the wiper arm means for joint pivotal movement about said pivot means.

2. The assembly of claim 1, wherein said first pump member is constructed as the major segment of a cylinder, and said second pump member comprises a hollow part-cylindrical component mounted sealingly within said first pump member and having a chordally extending wall, and wherein flap valve means are formed on said chordally extending wall.

3. The assembly of claim 2, wherein said first pump member includes partition walls extending substantially radially of the pump and in an inverted V-shaped orientation, and wherein further flap valve means are provided in each of said partition walls.

4. The assembly of claim 1 mounted in a vehicle including a source of hot water, and a source of cold water, said assembly including a two way selector valve communicating with the pump means and with said sources for selectively introducing water from either of said sources to feed said pump means.

5. The assembly of claim 1 mounted in a vehicle having water catchment surface means, said washing fluid supply means being in communication with said water catchment surface means.

6. The assembly of claim 1, hollow wiper blade support means communicated with said washing fluid supply means, and carried by said wiper arm means, and a wiper blade supported by said support means, the washing fluid applying means comprising aperture means formed in said hollow wiper blade support means, and said wiper arm means being hollow and communicating with said washing fluid supply means and said hollow wiper blade support means.

7. The assembly of claim 6 wherein the wiper blade has two ends, one near and the other remote from said pivot axis, and wherein the support means adjacent said remote end is constructed to define an array of apertures forming said aperture means.

8. The assembly of claim 7, wherein said array of apertures extends along one third of the extent of said hollow blade support means.

9. The assembly of claim 1, wherein said washing fluid applying means comprises a tube connected to and communicating with said wiper arm means, an outer sleeve mounted coaxially around said tube for rotation thereabout, means for limiting rotation of said outer sleeve relative to said tube between first and second angularly spaced positions, a first linear array of apertures extending axially along said outer sleeve, and a second array of apertures disposed along said tube for registration with the apertures of said first array when said outer sleeve is in its first position; and wherein a wiper blade is carried by said outer sleeve and has first and second sides, said first side being positioned adjacent said first array of apertures.

10. The assembly of claim 9, including a third plurality of apertures disposed adjacent said second side of said wiper blade, said third plurality of apertures being spaced from said first plurality of apertures by an angular distance equal to the angular distance between said first and second positions of the outer sleeve, said third plurality of apertures being in register with said second plurality of apertures when the outer sleeve is in its second position.